United States Patent [19]

Iliopulos et al.

[11] 4,355,118
[45] Oct. 19, 1982

[54] PROCESS FOR THE PRODUCTION OF INORGANIC-ORGANIC COMPOSITIONS

[75] Inventors: Miltiadis I. Iliopulos, Coraopolis; Gert F. Baumann, Pittsburgh, both of Pa.

[73] Assignee: Mobay Chemical Corporation, Pittsburgh, Pa.

[21] Appl. No.: 307,053

[22] Filed: Sep. 30, 1981

Related U.S. Application Data

[63] Continuation of Ser. No. 223,593, Jan. 9, 1981, abandoned.

[51] Int. Cl.$^3$ .............................................. C08G 18/14
[52] U.S. Cl. ................... 521/108; 521/117; 521/118; 521/121; 521/122; 521/128
[58] Field of Search ............... 521/108, 117, 118, 121, 521/222, 128

[56] References Cited

U.S. PATENT DOCUMENTS

| 3,971,665 | 7/1976 | Suzuki et al. | 106/58 |
| 3,981,831 | 9/1976 | Markusch et al. | 521/108 |
| 4,052,347 | 10/1977 | Dieterich et al. | 521/108 |
| 4,067,815 | 1/1978 | Scholl et al. | 252/8.1 |
| 4,078,029 | 3/1978 | Yoshida et al. | 264/63 |
| 4,097,422 | 6/1978 | Markusch | 521/108 |
| 4,146,509 | 3/1979 | Markusch et al. | 521/115 |

FOREIGN PATENT DOCUMENTS 35640 1/1981 European Pat. Off. .

OTHER PUBLICATIONS

The Journal of Physical & Colloid Chemistry, vol. 55, Baltimore, 1951, S. C. Lind, Article entitled "Some Quaternary Ammonium Silicates".

*Primary Examiner*—Maurice J. Welsh
*Attorney, Agent, or Firm*—Gene Harsh; Joseph C. Gil

[57] ABSTRACT

The instant invention is directed to a process for the production of an inorganic-organic foam composition comprising reacting an organic, nonionic hydrophilic polyisocyanate with an aqueous alkali metal silicate in the presence of a catalyst and a blowing agent, the improvement wherein said aqueous alkali metal silicate contains from 0.1 to 15% by weight, based on the weight of the aqueous alkali metal silicate, of a compound of the formula:

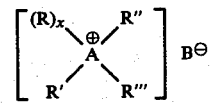

wherein A is selected from the group consisting of N, P and S,
wherein R, R', R" and R'" may be the same or different and are selected from the group consisting of allyl, vinyl, $C_1$ to $C_{17}$ alkyl or mono- or polyhydroxy substituted alkyl, $C_6$ to $C_{10}$ aryl or mono- or polyhydroxy substituted aryl, $C_7$ to $C_{22}$ aralkyl or mono- or polyhydroxy substituted aralkyl, and $C_7$ to $C_{22}$ alkaryl or mono- or polyhydroxy substituted alkaryl,
wherein x is 0 when A is S,
wherein x is 1 when A is N or P, and
wherein B is selected from the group consisting of OH, halogen and OR"" wherein R"" represents a $C_1$ to $C_{12}$ alkyl, with the proviso that when A is S, B is not OR"".

5 Claims, No Drawings

PROCESS FOR THE PRODUCTION OF INORGANIC-ORGANIC COMPOSITIONS

This application is a continuation, of application Ser No. 223,593, filed Jan. 9, 1981 now abandoned.

BACKGROUND OF THE INVENTION

Recently there has been interest in the production of inorganic-organic compositions for a variety of different uses. In one preferred method, these inorganic-organic compositions are derived from organic nonionic hydrophilic polyisocyanates and aqueous alkali metal silicate compositions. Characteristic of these types of compositions are those described in U.S. Pat. Nos. 4,052,347; 3,981,831; 4,067,815 and 4,097,422. Although the compositions described in the above-noted patents are relatively easy to process by hand-mixing methods, where the mixing time is relatively long (e.g., in excess of 15 seconds), many of them are not capable of being processed when using conventional high pressure and/or low pressure mixing machines commonly used in the polyurethane industry and which commonly require relatively short mix times (e.g., less than 5 seconds). The commercial utilization of such compositions has thus not been as great as would have been expected from the wide property spectrum of the products attainable.

In today's energy conscious world, a significant market has developed in the so-called "retro-fit" market. In the retro-fit market, insulation is sprayed between the walls of existing buildings. Inorganic-organic compositions, because of their excellent insulative properties, would be very desirable for such use. However, because of the need to utilize relatively simple mixing equipment and since inorganic-organic compositions currently available cannot be processed on conventional high or low pressure mixing equipment, inorganic-organic compositions have not been used to any great extent in the retro-fit market.

Mixtures of alkali metal silicate and quaternary ammonium compounds such as phenyltrimethyl ammonium hydroxide and the like are known (see, e.g., JOURNAL OF PHYSICAL & COLLOID CHEMISTRY, 1951, pages 187–195). The known uses of such materials include mold binders (U.S. Pat. No. 4,078,029), refractory compositions (U.S. Pat. No. 3,971,665) and, in combination with triglycidyl isocyanurate, a binder for use in making refractory moldings.

DESCRIPTION OF THE INVENTION

It has now been found that highly useful organic-inorganic compositions can be produced using conventional mixing equipment, requiring relatively short mixing times (i.e., less than 5 seconds), when certain onium compounds are included in the aqueous alkali metal silicate.

More specifically, the present invention is directed to an improved process for the production of an inorganic-organic foam composition by reacting an organic, nonionic hydrophilic polyisocyanate with an aqueous alkali metal silicate in the presence of a catalyst and a blowing agent, the improvement wherein the aqueous alkali metal silicate contains from 0.1 to 15% by weight, based on the weight of the aqueous alkali metal silicate, of a compound of the formula:

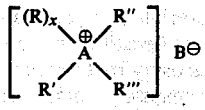

wherein A is selected from the group consisting of N, P and S,
wherein R, R', R" and R'" may be the same or different and are selected from the group consisting of allyl, vinyl, $C_1$ to $C_{17}$, and preferably $C_1$ to $C_4$, alkyl or mono- or polyhydroxy substituted alkyl, $C_6$ to $C_{10}$ aryl or mono- or polyhydroxy substituted aryl, $C_7$ to $C_{22}$ aralkyl or mono- or polyhydroxy substituted aralkyl and $C_7$ to $C_{22}$ alkaryl or mono- or polyhydroxy substituted alkaryl,
wherein x is 0 when A is S,
wherein x is 1 when A is N or P, and
wherein B is selected from the group consisting of $OH^\ominus$, halogen and $OR''''^\ominus$, wherein R'''' represents a $C_1$ to $C_{12}$, preferably $C_1$ to $C_4$ alkyl and with the proviso that when A is S, B is not $OR''''^\ominus$.

The reaction of an organic, nonionic hydrophilic polyisocyanate and an aqueous alkali metal silicate in the presence of a catalyst and a blowing agent is known and is described in U.S. Pat. Nos. 4,052,347; 3,981,831; 4,067,815 and 4,097,422, the disclosures of which are herein incorporated by reference. It has been found that the mixture reacts nonuniformly unless the components are mixed together for a relatively long time (e.g., more than 15 seconds). It is believed that this nonuniform reaction is due to the instability of the multiphase reacting mixture. The onium additives of the present invention have been found to stabilize the reacting mixture, thereby preventing phase separation of the multiphases present.

The inorganic-organic compositions of the present invention are produced from the onium-containing aqueous alkali silicate compositions, an organic hydrophilic polyisocyanate, a catalyst and an organic blowing catalyst.

The alkali silicates useful in the present invention are known and described, e.g., in the four patents incorporated by reference above.

The invention contemplates the use of any suitable aqueous solution of an alkali metal silicate, generally containing from 10 to 70% by weight of said alkali metal silicate such as, for example, sodium silicate, potassium silicate or the like. Such aqueous silicates are normally referred to as "waterglass." It is also possible to use crude commercial-grade solutions which can additionally contain, for example, calcium silicate, magnesium silicate, borates, aluminates and/or other inorganic salts, e.g., potassium hydrogen phosphate (see, e.g., U.S. Pat. No. 4,062,815). The $Me_2O:SiO_2$ ratio is not critical and can vary within the usual limits, preferably amounting to 4–0.2. Me, of course, refers to the alkali metal. Preferably, sodium silicate with a molar ratio of $Na_2O:SiO_2$ between 1:1.6 and 1:3.3 is used. It is preferred to use 32 to 45% silicate solutions which have a viscosity of less than 1,000 cps at room temperature which is generally the limit required to ensure problem-free processing. Although ammonium silicate solutions can also be used, they are less preferred. The solutions can either be genuine solutions or even colloidal solutions.

The choice of concentration of the aqueous silicate solution is governed above all by the required end product. Open-cell materials are preferably prepared with concentrated silicate solutions which, if necessary, are adjusted to low viscosity by the addition of water. 15% to 50% by weight silicate solutions are preferably used for the production of open-cell lightweight foams in order to obtain low viscosities, sufficiently long reaction times and low densities. Even in cases where finely divided inorganic fillers are used in relatively large quantities, 15 to 50% by weight silicate solutions are preferred.

It is also possible to make the silicate solution in situ by using a combination of solid alkali metal silicate and water.

The onium compounds used in the present invention are generally known and are of the formula:

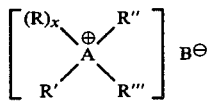

wherein A, B, R, R', R", R'" and x are as defined above. Useful ammonium compounds include: dimethyl diethanol ammonium hydroxide; methyl triethanol ammonium hydroxide (most preferred); diethyl diethanol ammonium hydroxide; tetraethanol ammonium hydroxide; the various trialkyl monoethanol ammonium hydroxides; phenyl triethanolammonium hydroxide; the various benzyl trialkanol ammonium hydroxides; benzyl triethyl ammonium hydroxide; benzyl trimethyl ammonium hydroxide (preferred); benzyl triphenyl ammonium hydroxide; cetyl trimethyl ammonium hydroxide; cetyl dimethyl benzyl ammonium hydroxide; myristyl dimethyl benzyl ammonium hydroxide; stearyl trimethyl ammonium hydroxide; tetramethyl ammonium hydroxide; benzyl triethyl ammonium chloride (preferred); benzyl triethyl ammonium bromide (preferred); bromoethyl trimethyl ammonium bromide; cetyl trimethyl ammonium bromide; methyl tributyl ammonium iodide; myristyl trimethyl ammonium bromide; phenyl trimethyl ammonium iodide; tetrabutyl ammonium chloride; tetrabutyl ammonium iodide; tetraethyl ammonium bromide; allyl triethyl ammonium bromide; allyl triethyl ammonium chloride; tridodecyl methyl ammonium chloride; tris-(hydroxymethyl)-methyl ammonium chloride; benzyl trimethyl ammonium methoxide (preferred); benzyl triethyl ammonium ethoxide; and the like.

Useful phosphonium compounds include: methyl trialkyl phosphonium iodide; methyl trivinyl phosphonium bromide; tetraethyl phosphonium hydroxide; tetrabenzyl phosphonium hydroxide; methyl triphenyl phosphonium hydroxide; benzyl triphenyl phosphonium chloride (preferred); tetramethyl phosphonium bromide, chloride or iodide; tetraethyl phosphonium bromide, chloride or iodide; methyl-tri-n-butyl phosphonium iodide; tetrabutyl phosphonium bromide, chloride or iodide; ethyl triphenyl phosphonium methoxide; ethyl triphenyl phosphonium ethoxide; ethyl triphenyl phosphonium butoxide; methyl triphenyl phosphonium methoxide; methyl triphenyl phosphonium ethoxide; and the like.

Useful sulfonium compounds include: trimethyl sulfonium hydroxide; triethyl sulfonium hydroxide; tributyl sulfonium hydroxide; triethyl sulfonium iodide; triphenyl sulfonium chloride; trimethyl sulfonium iodide or chloride; and the like.

In general, it is most preferred that the onium compound used contain at least one hydroxyl group since it has been found that the alkali metal silicate solutions are completely compatible therewith. Stable solutions are thereby produced. If onium compounds without hydroxyl substitutes are used, the silicate-onium mixture should be prepared just before use since such mixtures tend to separate upon standing.

As disclosed earlier, the isocyanates useful herein are organic, nonionic hydrophilic polyisocyanates which have been described, for example, in the four U.S. patents noted above.

The nonionic hydrophilic isocyanates which are used according to the invention may be prepared by known methods, e.g., by reacting organic hydroxyl compounds which have a molecular weight of about 200 to about 5,000, in particular mono- or polyhydroxyl polyethers, optionally mixed with polyhydric alcohols which have a molecular weight below about 200, with an excess of organic polyisocyanates.

Any suitable organic polyisocyanate may be used. The average molecular weight of the organic polyisocyanate should preferably be between 300 and 8,000 (most preferably between 400 and 5,000). Suitable polyisocyanates include aliphatic, cycloaliphatic, araliphatic, aromatic or heterocyclic polyisocyanates such as those described, e.g., by W. Siefken in Justus Liebigs Annalen der Chemie 562, pages 75 to 136, for example, ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethyl-cyclohexane (German Auslegeschrift No. 1,202,785); hexahydrotolylene-2,4- and -2,6-diisocyanate and any mixtures of these isomers; hexahydrophenylene-1,3- and/or -1,4-diisocyanate; perhydrodiphenylmethane-2,4'- and/or -4,4'-diisocyanate; phenylene-1,3- and -1,4-diisocyanate; tolylene-2,4- and -2,6-diisocyanate and any mixtures of these isomers; diphenylmethane-2,4'- and/or -4,4'-diisocyanate; naphthylene-1,5-diisocyanate; triphenylmethane-4,4',4"-triisocyanate; polyphenylpolymethylene polyisocyanates which may be obtained by aniline-formaldehyde condensation followed by phosgenation and which have been described, e.g., in British Pat. Nos. 874,430 and 848,671; perchlorinated aryl polyisocyanates such as those described, e.g., in German Auslegeschrift No. 1,157,601; polyisocyanates which contain carbodiimide groups as described in German Pat. No. 1,092,007; the diisocyanates described in U.S. Pat. No. 3,492,330; polyisocyanates which contain allophanate groups as described, e.g., in British Pat. No. 994,890; Belgian Pat. No. 761,626 and published Dutch Patent Application No. 7,102,524; polyisocyanates which contain isocyanurate groups as described, e.g., in German Pat. Nos. 1,022,789; 1,222,067 and 1,027,394 and in German Offenlegungsschriften Nos. 1,929,034 and 2,004,048; polyisocyanates which contain urethane groups as described, e.g., in Belgian Pat. No. 752,261 or U.S. Pat. No. 3,394,164; polyisocyanates which contain acylated urea groups in accordance with German Pat. No. 1,230,778; polyisocyanates which contain biuret groups as described, e.g., in German Pat. No. 1,101,394; in British Pat. No. 889,050 and in French Pat. No. 7,017,514; polyisocyanates prepared by telomerization reactions as described, e.g., in Belgian Pat. No. 723,640; polyisocyanates which contain ester groups as described, e.g., in British Pat. Nos. 965,474 and 1,072,956, in U.S. Pat. No. 3,567,763 and in German Pat. No. 1,231,688 and reaction products of the above-mentioned isocyanates with acetals in accordance with German Pat. No. 1,072,385.

The distillation residues which still contain isocyanate groups obtained from the commercial production of isocyanates are preferred and may be dissolved in one or more of the above-mentioned polyisocyanates. Any mixtures of the above-mentioned polyisocyanates may also be used.

It is generally preferred to use commercially readily available polyisocyanates such as polyphenyl-polymethylene-polyisocyanates obtained by anilineformaldehyde condensation followed by phosgenation ("crude MDI") and polyisocyanates which contain carbodiimide groups, urethane groups, allophanate groups, isocyanurate groups, urea groups or biuret groups ("modified polyisocyanates").

The isocyanate group can also be present in masked form, for example, as a uretdione or caprolactam adduct. The polyisocyanates used in the process according to the invention preferably contain from about 2 to 10, more preferably from 2.2 to 4 isocyanato groups.

Suitable organic polyisocyanates also include prepolymers obtained by the so-called isocyanate-polyaddition process of the kind which have been repeatedly described over recent years. It is no problem to control virtually any known isocyanate reaction so that it can be stopped at least temporarily at a prepolymer stage. The prepolymers include not only adducts of polyisocyanates with alcohols, mercaptans, carboxylic acids, amines, ureas and amides, but also reaction products of the foregoing polyisocyanates with themselves such as uretdiones, isocyanurates, carbodiimides which can readily be obtained from monomeric polyisocyanates with an increase in molecular weight.

NCO-prepolymers particularly suitable for the process according to the invention are prepared by methods known per se, for example, by reacting polyhydroxyl compounds with a molecular weight of from about 200 to 5,000, more especially polyhydroxyl polyesters and polyhydroxypolyethers, if desired, in admixture with polyhydric alcohols with a molecular weight of less than 200, with excess quantities of polyisocyanates, for example, hexamethylene diisocyanate; 2,4-tolylene diisocyanate; 2,6-tolylene diisocyanate; 4,4'-diisocyanato-diphenylmethane and the like.

Nonionic hydrophilic modification of the prepolymer may be achieved, for example, by reacting a polyisocyanate with a hydrophilic polyether which contains groups which are reactive with isocyanate groups or with a siloxane compound which contains hydrogen atoms which are reactive with isocyanate groups. Polyethers which have been synthesized from alcohols with a functionality of 1 to 3 and ethylene oxide and/or propylene oxide and which contain terminal OH groups are preferred. Other compounds containing polyether groups which have been prepared by different methods may, of course, be used in preparing the prepolymer provided such compounds contain hydrophilic groups. It is particularly preferred to use monofunctional polyethers based on monoalcohols, which polyethers contain up to about 300 ethylene oxide because the nonionic hydrophilic prepolymers prepared from these starting materials generally have a viscosity of less than 50,000 cP, which is advantageous for working up, and preferably less than 10,000 cP.

The reaction products of the above-mentioned polyisocyanates with aliphatic polycarbonates which contain hydrogen atoms which are reactive with isocyanate groups are also suitable prepolymers for the purpose of the invention. Examples of such prepolymers are polycarbonates based on ethylene glycol, propylene glycol or tetraethylene glycol. Prepolymers which contain a hydrophilic polyether segment, e.g., of triethylene glycol or diethylene glycol and succinic acid or oxalic acid are also suitable.

The hydrophilic center may also be introduced by incorporating a glycol such as triethylene or tetraethylene glycol, preferably in combination with a very hydrophilic isocyanate such as a biuret diisocyanate or biuret triisocyanate.

The hydrophilic groups may be present in the main chain or the side chain of the prepolymer.

In addition to the hydrophilic-nonionic segment, there may also be an ionic center either in the same or some other molecule. Such ionic-nonionic combinations enable the morphology and interface chemistry of the multiphase plastics of the invention to be adjusted as desired.

If desired, prepolymers known per se and particularly those based on aromatic isocyanates may also be subsequently reacted by the processes mentioned above to produce nonionic hydrophilic prepolymers.

Particularly suitable prepolymers which have a high stability in storage can also be obtained by reacting aromatic isocyanates such as tolylene diisocyanate, diphenylmethane diisocyanates and the known phosgenation products of the products of condensation of aromatic monoamines, such as aniline, and aldehydes, such as formaldehyde, with hydrophilic polyethers which contain groups which are reactive with isocyanates. These nonionic hydrophilic polyisocyanates which, according to IR spectroscopic analysis, in part still contain detectable urea and biuret groups as well as urethane and/or allophanate groups in cases where polyol modification has been carried out are eminently suitable as prepolymers.

The phosgenation products used for nonionic hydrophilic modification are preferably products of the phosgenation of higher molecular weight aniline/formaldehyde condensation products which have a viscosity at 25° C. of about 50 to 10,000 cps, preferably 100 to 5,000 cps.

Reaction products of 50–99 mols of aromatic diisocyanates and 1–50 mols of the usual organic compounds which contain at least two hydrogen atoms capable of reacting with isocyanates and generally have a molecular weight of about 200 to about 10,000 may also be used. Apart from compounds of this kind which contain amino groups, thiol groups or carboxyl groups, these compounds are preferably polyhydroxyl compounds, in particular compounds which contain 2-8 hydroxyl groups, and especially those with a molecular weight of about 800 to about 10,000, preferably about 1,000 to 6,000, e.g., polyesters, polyethers, polythioethers, polyacetals, polycarbonates and polyesteramides which contain at least 2 and generally 2-8 but preferably 2-4 hydroxyl groups of the kind which are known per se for producing both homogeneous and cellular polyurethanes.

Any suitable polyester which contains hydroxyl groups may be used such as, for example, the products obtained by reacting polyhydric alcohols, preferably glycols, with the optional addition of trihydric alcohols, with polybasic, preferably dicarboxylic, acids. Instead of free polycarboxylic acids, the corresponding carboxylic acid anhydrides or corresponding polycarboxylic acid esters of lower alcohols or mixtures of these may be used for preparing the polyesters. The polycarboxylic acids may be aliphatic, cycloaliphatic, aromatic and/or heterocyclic and may be substituted, e.g., with halogen atoms and/or unsaturated. The following are given as examples: succinic acid, adipic acid, azelaic acid, suberic acid, sebacic acid, terephthalic acid, phthalic acid, isophthalic acid, trimetallic acid, phthalic acid anhydride, tetrahydrophthalic acid anhydride, hexahydrophthalic acid anhydride, tetrachlorophthalic acid anhydride, tetrabromophthalic acid, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethyl terephthalate and diethylene terephthalate. Any suitable polyhydric alcohol may be used such as, for example, ethylene glycol, propylene-1,2- and -1,3-glycol, butylene-1,4- and -2,3-glycol, hexane-1,6-diol, octane-1,8-diol, neopentyl glycol, cyclohexane dimethanol (1,4-bis-hydroxymethylcyclohexane), 2-methyl-propane-1,3-diol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may contain some terminal carboxyl groups. Any suitable polyester of a lactone some as ε-caprolactone or hydroxycarboxylic acids, e.g., ω-hydroxycaproic acid may also be used.

Any suitable polyether which contains at least 2 and generally 2–8, preferably 2 or 3 hydroxyl groups known per se and prepared, e.g., by polymerizing epoxides such as ethylene oxide, propylene oxide, butylene oxide, tetrahydrofuran, styrene oxide, trichlorobutylene oxide or epichlorohydrin, each with itself, e.g., in the presence of $BF_3$ or by a reaction of addition of these epoxides, optionally as mixtures or successively, to starting components which contain reactive hydrogen atoms such as water, ethylene glycol, propylene-1,3- or -1,2-glycol, trimethylolpropane and 4,4'-dihydroxydiphenylpropane may be used. Sucrose polyethers, e.g., those described in German Auslegeschriften Nos. 1,176,358 and 1,064,938, may also be used for the process of the invention. It is frequently preferred to use those polyethers which contain predominately primary OH groups (up to 90% by weight, based on all the OH groups present in the polyether). Polyethers which have been modified with vinyl polymers, e.g., by polymerization with styrene or acrylonitrile in the presence of polyethers (U.S. Pat. Nos. 3,383,351; 3,304,273; 3,523,093 and 3,110,695 and German Pat. No. 1,152,536) and polybutadienes which contain OH groups are also suitable.

Any suitable polythioether may be used including the condensation products of thiodiglycol with itself and/or with other glycols, dicarboxylic acids, formaldehyde, aminocarboxylic acids or amino alcohols. The products obtained are polythio mixed ethers, polythioether esters or polythioether ester amides, depending on the co-component.

Any suitable polyacetal may be used, e.g., the compounds obtained from glycols such as diethylene glycol, triethylene glycol, bis-2-hydroxyethyl ether of Bisphenol A, hexanediol and formaldehyde. Polyacetals suitable for the process according to the invention may also be prepared by polymerizing cyclic acetals.

Any suitable hydroxyl polycarbonates of the kind already known per se may be used such as, e.g., those obtained by reacting diols such as propane-1,3-diol, butane-1,4-diol and/or hexane-1,6-diol, diethylene glycol, triethylene glycol or tetraethylene glycol with diaryl carbonates such as diphenylcarbonate or phosgene.

Any suitable polyester amide or polyamides may be used including, for example, the condensates which can be obtained from polyvalent saturated and unsaturated carboxylic acids or their anhydrides and polyvalent saturated and unsaturated aminoalcohols, diamines, polyamines and mixtures thereof.

Polyhydroxyl compounds which already contain urethane or urea groups as well as modified or unmodified natural polyols such as castor oil, carbohydrates or starch may also be used. Addition products of alkylene oxides and phenol formaldehyde resins or of alkylene oxides and urea formaldehyde resins may also be used according to the invention.

Representatives of these organic compounds having reactive hydrogen atoms which may be used for the process according to the invention are described, e.g., in High Polymers, Volume XVI, "Polyurethanes: Chemistry and Technology" by Saunders and Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich, 1966, e.g., on pages 45–71, the disclosures of which are incorporated herein by reference.

The nonionic hydrophilic center may be introduced by including suitable nonionic hydrophilic substances or by a subsequent reaction.

The prepolymers obtained by the usual nonionic hydrophilic modification frequently have a viscosity at 25° C. of more than 1,000 cP and, in some cases, up to 100,000 cP or more. In cases where such high viscosities are undesirable for subsequent processes carried out on the product, the viscosity may be lowered to a desirable level by adding low viscosity isocyanates or inert solvents. Furthermore, the length of time of the hardening process may be increased by a combination of such prepolymers with the usual low viscosity isocyanates.

Nonionic hydrophilic prepolymers which are particularly preferred are obtained by reacting aromatic polyisocyanates with monofunctional hydrophilic polyethers based on alcohols and ethylene oxide with a molecular weight of up to about 2,000. Prepolymers of this kind can be obtained simply by reacting the aromatic polyisocyanates with the hydrophilic polyethers which contain terminal OH groups at room temperature or at elevated temperatures and they are characterized by containing urethane groups and/or allophanate groups.

The presence of only a low proportion of nonionic hydrophilic groups is sufficient to ensure the desired high degree of compatibility of the nonionic hydrophilic prepolymers with the aqueous silicate solution. For example, 1% to 2% by weight, based on the prepolymer, is sufficient although the proportion of nonionic hydrophilic groups is preferably 5% to 40% by weight. In exceptional cases, for example, if the nonionic hydrophilic prepolymers contain comparatively nonreactive isocyanate groups or other end groups, the proportion of nonionic hydrophilic groups may be increased to more than 50% by weight.

The prepolymer which has been modified with nonionic hydrophilic groups may, of course, be prepared just before it is mixed with silicate solution, e.g., conventional hydrophobic prepolymers such as the phosgenation product of an aniline-formaldehyde condensate may be mixed with a hydrophilic polyether which contains OH or NH groups immediately before it is mixed with waterglass.

The reaction with carboxyl groups or with aminocarbamates is also accompanied by the liberation of $CO_2$ which acts as a hardener. Carbon dioxide is also formed if the process is carried out in the presence of catalysts which accelerate carbodiimide formation such as phospholine oxide. In all these reactions, one advantage of the process of this invention is that the carbonic acid formed in most cases diffuses quantitatively and practically instantly into the aqueous phase where it effects hardening of the silicate solution.

In producing the inorganic-organic compositions of the present invention, an amine catalyst is also necessary. Suitable catalysts include amines including primary, secondary or tertiary amines. Specific amines useful according to the instant invention include, e.g., tertiary amines such as triethylamine, tributylamine, N-methylmorpholine, N-ethylmorpholine, N-cocomorpholine, N,N,N',N'-tetramethylethylenediamine; 1,4-diaza-bicyclo-(2,2,2)-octane, N-methyl-N'-dimethylaminoethyl piperazine, N,N-dimethyl benzylamine, bis-(N,N-diethylaminoethyl)-adipate, N,N-diethyl benzylamine, pentamethyl diethylenetriamine, N,N-dimethyl cyclohexylamine, N,N,N',N'-tetramethyl-1,3-butanediamine, N,N-dimethyl-$\beta$-phenyl ethylamine and particularly also hexahydrotriazine derivatives. Also useful as a catalyst is 1,2-dimethyl imidazole and 2-methyl imidazole.

The following are examples of tertiary amines containing hydrogen atoms which are reactive with isocyanate groups: triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silamines with carbon-silicon bonds may also be used as catalysts, e.g., those described in German Pat. No. 1,229,290, for example, 2,2,4-trimethyl-2-silamorpholine or 1,3-diethyl-aminomethyltetramethyldisiloxane.

Alkali metal hydroxides such as sodium hydroxide, alkali metal phenolates such as sodium phenolate or alkali metal alcoholates such as sodium methylate may also be used as catalysts.

Also useful are mono-, bis- and polyoxyalkylated aliphatic, cycloaliphatic, aromatic and heterocyclic primary amines such as N-propyl-diethanolamine, N-isopropyldiethanolamine, N-butyl-diethanolamine, N-isobutyl-diethanolamine, N-oleyl-diethanolamine, N-stearyl-diethanolamine, oxyethylated coconut fatty amines, N-allyl-diethanolamine, N-methyl-diisopropanolamine, N-ethyl-diisopropanolamine, N-propyl-diisopropanolamine, N-butyl-diisopropanolamine, N-cyclohexyl-diisopropanolamine, N,N-dioxyethyl aniline, N,N-dioxyethyl-toluidine, N,N-dioxyethyl-$\alpha$-aminopyridine, N,N-bis(2-hydroxyethyl)piperazine, dimethyl-bis-oxyethyl hydrazine, N,N'-bis($\beta$-hydroxyethyl)-N,N'-diethyl-hexahydro-p-phenylene diamine, N-$\beta$-hydroxyethyl piperazine, polyalkoxylated amines such as propoxylated methyl-diethanolamine, compounds such as N-methyl-N,N-bis-$\gamma$-aminopropylamine, N-($\gamma$-aminopropyl)-N,N'-dimethylethylene diamine, N-($\gamma$-aminopropyl)-N-methylethanolamine, N,N'-bis($\gamma$-aminopropyl)-piperazine, N-($\beta$-aminoethyl)-piperazine, N,N'-bis-oxyethylpropylene diamine, 2,6-diaminopyridine, diethanolamine-acetamide, diethanolaminopropionamide, N,N-bis-oxyethyl-phenyl-thiosemicarbazide, N,N-bis-oxyethyl-methylsemicarbazide, p,p'-bis-aminomethyldibenzyl methylamine, 2,6-diamino-pyridine, N,N-dimethyl-ethanolamine, N,N-diethyl-ethanolamine, 1-dimethylaminopropanol-(2), N-oxyethylmorpholine, N-methyl-N-$\beta$-hydroxyethyl aniline, N-oxyethylpiperidine, $\alpha$-hydroxyethyl-pyridine, $\gamma$-hydroxyethylquinoline, N,N-dimethyl hydrazine, N,N-dimethyl-ethylene diamine, 1-diethylamino-4-aminopentane, $\alpha$-aminopyridine-3-amino-N-ethyl carbazol, N,N-dimethylpropylenediamine, N-aminopropyl-piperidine, N-aminopropylmorpholine, N-aminopropyl-ethylene imine, 1,3-bis-piperidino-2-aminopropane, methylamine, diethylamine, trimethylamine, dimethylamine, ethylamine, pyridine, aniline, toluidine, alkoxylated amines such as ethanolamine, diethanolamine, triethanolamine, methyl diethanolamine, dimethyl aminoethanol or oleyl diethanolamine and polyfunctional polyamines in which the individual amino groups may differ from each other in their basicity, for example, the polyamines obtained by hydrogenating the addition products of acrylonitrile and primary or secondary amines, or peralkylated or partially alkylated polyamines such as N,N-dimethyl ethylene diamine and N,N-dimethyl-1,3-propane diamine, compounds such as $\alpha$-aminopyridine, N,N-dimethyl hydrazine or the like.

In the most preferred embodiment and one which is particularly useful for use in retro-fit applications, the amine groups of the amine catalysts are masked through formation of a salt with a sulfonic acid. If the amine catalysts are not "masked", it is necessary to keep the amine separate from the various components until the final mixing step since the amine catalysts are generally immiscible with the silicate component and will cause the isocyanate component to react prematurely. Suitable "masking" agents include such materials as p-dodecylbenzene sulfonic acid, p-acetyl benzene sulfonic acid, anthraquinone-1,5-disulfonic acid, anthraquinone-2,6-disulfonic acid, anthraquinone-2-sulfonic acid and o-benzene disulfonic acid, benzene sulfonic acid, 2-bromoethane sulfonic acid, water soluble d,l-camphor sulfonic acid, 2-chloroethane sulfonic acid, 4-di-benzofuran sulfonic acid, 2,5-dihydroxy-p-benzene sulfonic acid, 4,5-dihydroxy-naphthalene-2,7-disulfonic acid, 1-dodecane sulfonic acid, ethane sulfonic acid, hydroquinone sulfonic acid, 2-hydroxy-4-methoxybenzophenone-5-sulfonic acid, 3-hydroxyl-1-propane sulfonic acid, 8-hydroxyquinoline-5-sulfonic acid, 2-mesitylene sulfonic acid, methane sulfonic acid, 2-methyl-2-propane-1-sulfonic acid, 2,6-naphthalene-disulfonic acid, 1-naphthalene sulfonic acid, 2-naphthalene sulfonic acid, picryl sulfonic acid, p-toluene sulfonic acid, 1-tridecane sulfonic acid, trifluoromethane sulfonic acid, 1-undecane sulfonic acid and the like. The sulfonic acids listed above which contain hydroxyl groups will react with the isocyanate and form an isocyanate derivative in which the side chain bearing the sulfonic group is linked through a urethane group.

By masking the amine group, it is possible to premix the isocyanate component with the catalyst to produce a storage stable isocyanate. Once this premix is mixed with the stabilized alkaline silica solution, the amine becomes unblocked and catalyzes the reaction. In general, enough of the sulfonic acid material should be added to neutralize all of the amine groups present. An excess of the sulfonic acid material may even be desirable since, as is known in the art, such acids are surfactants.

The amounts of components can be varied over a wide range of produce highly useful inorganic-organic compositions. In general, useful compositions are produced by reacting:
  (a) from 5 to 98% by weight of the organic hydrophilic polyisocyanate,
  (b) from 2 to 95% by weight of the silicate solution containing the onium compound, and
  (c) an amount of amine catalyst such that the total parts by weight of nitrogen supplied by the amine catalysts is from 0.01 to 1.5 per 100 parts by weight of said organic hydrophilic polyisocyanate, and preferably from 0.01 to 1.2 parts per 100 parts of polyisocyanate.

Various other materials may be added to the organic-inorganic compositions of the present invention.

In the production of foams by the process according to the invention, it is also necessary to use expanding or blowing agents. Any suitable blowing agent may be used including, for example, inert liquids boiling at temperatures of from −25° to +50° C. The blowing agents preferably have boiling points of from −15° to +40° C. Particularly suitable blowing agents are alkanes, alkenes, halogen-substituted alkanes and alkenes or dialkyl ethers such as, for example, saturated or unsaturated hydrocarbons with 1 to 7 carbon atoms such as isobutylene, butadiene, isoprene, butane, pentane, petroleum ether, halogenated saturated or unsaturated hydrocarbons such as methyl chloride, methylene chloride, fluorotrichloromethane, difluorodichloromethane, trifluorochloromethane, chloroethane, vinyl chloride and vinylidene chloride. Trichlorofluoromethane has proved to be the most suitable.

Thus, any suitable highly volatile inorganic and/or organic substances may be used as a blowing agent, including those listed above. Additional suitable blowing agents are, for example, acetone, ethylacetate, hexane or diethylether. Foaming can also be achieved by adding compounds which decompose at temperatures above room temperature to liberate gases such as nitrogen, for example, azo compounds such as azoisobutyric acid nitrile. Other examples of blowing agents are included, for example, in Kunststoff-Handbuch, Volume VII, published by Vieweg-Hochtlen, Carl-Hanser-Verlag, Munich, 1966, e.g., on pages 108 and 109, 453 to 455 and 507 to 510, but the water contained in the mixture may also function as blowing agent. Fine metal powders such as powdered calcium, magnesium, aluminum or zinc may also be used as blowing agents since they evolve hydrogen in the presence of waterglass which is sufficiently alkaline and, at the same time, have a hardening and reinforcing effect.

It has been found that blowing agents which contain fluorine such as those listed above exhibit a synergistic effect in that they not only function to foam the reaction mixture but also they have a special effect in that they decrease the surface tension of the organic phase. This is important because it makes it possible to obtain high quality products even with relatively small amounts of polyisocyanates. Furthermore, the use of a fluorine, containing blowing agent such as the chloro fluoro alkanes listed above assists in creating a greater differential between the surface tension of the inorganic phase which is higher and the surface tension of the organic phase.

The blowing agents may be used in quantities of up to 50% by weight and preferably in quantities from 2 to 15% by weight, based on the reaction mixture.

Foams can, of course, also be produced with the assistance of inert gases, especially air. For example, one of the two reaction components can be prefoamed with air and then mixed with the other. The components can also be mixed, for example, by means of compressed air so that the foam is directly formed with subsequently hardening in molds. Also suitable are frothing or air nucleation processes.

Other substances, such as emulsifiers, activators, and foam stabilizers normally used in the production of polyurethane foams, can also be added. However, they are generally not necessary. An addition of silanes, polysiloxanes, polyether polysiloxanes or silyl modified isocyanates can intensify the interaction between the two phases. Examples of foam stabilizers are disclosed in U.S. Pat. No. 3,201,372 at column 3, line 46 to column 4, line 5.

The invention is further illustrated but is not intended to be limited by the following Examples in which all parts and percentages are by weight unless otherwise specified. The following materials were used in the Examples:

Polyisocyanates

P1: The phosgenation product of an aniline/formaldehyde condensate having a viscosity at 25° C. of 200 mPa-s and an NCO content of 31.5% by weight (dinuclear content about 51%).

P2: The phosgenation product of an aniline/formaldehyde condensate having a viscosity at 25° C. of 200 mPa-s and an NCO content of 31.5% by weight (dinuclear content about 49%).

P3: The phosgenation product of an aniline/formaldehyde condensate having a viscosity at 25° C. of 2,000 mPa-s and an NCO content of 30.8% by weight (dinuclear content about 46%).

Hydrophilic Modifiers

M1: Carbowax 600: a polyoxyethylene glycol, commercially available from Union Carbide Corporation, having an average molecular weight of from 570 to 630.

M2: A polyoxyethylene glycol having an average molecular weight of 600 and an OH number of 180.

M3: A mixture of polyethylene oxide mono-alcohol, initiated on n-butanol, and polyethylene oxide glycols, initiated on water. The initial butanol to water ratio is 95 to 5. The OH number of the product is 42.

M4: UCON 75-H-450: a polyoxyethylene glycol having a molecular weight of 1300, commercially available from Union Carbide.

M5: A polyoxyethylene oxide mono-alcohol, initiated on n-butanol, having an average molecular weight of about 1100 and an OH number of 49.

Onium Compounds

O1: Methyltriethanol ammonium hydroxide.
O2: Benzyltriethyl ammonium chloride.
O3: Benzyltriphenyl phosphonium chloride.

O4: Benzyltriethyl ammonium bromide.

O5: Benzyltrimethyl ammonium hydroxide—40% solution in methanol.

O6: Benzyltrimethyl ammonium methoxide—40% solution in methanol.

Amine Catalysts

C1: Triethylamine.

C2: (1,3,5-tris-dimethylaminopropyl)-5-hexahydrotriazine.

Miscellaneous Hydroxyl Group-containing Materials

H1: A chlorendic anhydride ethoxylated monoester having an OH number of about 200, an acid number of about 3 and a chlorine content of about 40%.

H2: VIRCOL 82: a phosphorus-containing polyol available from MOBIL CHEMICAL COMPANY having an OH number of 205, an acid number of 0.3, a functionality of 2 and a phosphorus content of 11.3%.

H3: A sucrose/trimethylolpropane/propylene oxide polyether having an average functionality of about 5 and molecular weight of about 380.

Silicates

S1: Aqueous sodium silicate solution—Type D containing 44% by weight solids and commercially available from P. Q. CORPORATION.

S2: Aqueous sodium silicate solution—Type C containing 48% by weight solids and commercially available from P. Q. CORPORATION.

Additives

A1: p-dodecyl benzene sulfonic acid.

A2: Tris (β-chloropropyl) phosphate.

A3: Freon R-11-B: trichloro fluoro methane.

A4: Cresyl diphenyl phosphate.

A5: Bis-2-hydroxyethyl ether of tetrabromobisphenol A.

A6: 40% by weight aqueous solution of dibasic potassium phosphate.

A7: Dimethyl methyl phosphonate.

A8: PAROIL 1160: a chlorinated hydrocarbon commercially available from DOVER CHEMICAL COMPANY containing about 60% by weight chlorine and having a viscosity of 2000 cps at 25° C.

A9: L5340: a commercially available polydimethylsiloxane-polyoxyalkylene block copolymer available from UNION CARBIDE.

EXAMPLES

Example 1

In Examples 1 through 7, the hydrophilic polyisocyanates were prepared by (1) preheating the isocyanate (P) to about 70° C.; (2) the hydrophilic modifier (M) was then added with vigorous stirring; (3) the batch was then held at 70° C. for about one hour with stirring and under a nitrogen atmosphere. A hydrophilic polyisocyanate was prepared by reacting a blend of about 42 parts by weight of P2 and about 42 parts by weight of P3 with about 17 parts of M1. The resultant hydrophilic polyisocyanate had an NCO content of 23% by weight and a viscosity of 6000 cps at 25° C.

A catalyst mixture (hereinafter referred to as Mixture 1) was then prepared by mixing about 48 parts of A1, about 39 parts of A2 and about 13 parts of C1.

An "A" side was then prepared by blending about 110 parts of the hydrophilic polyisocyanate, about 18 parts of Mixture 1, about 27 parts of A2, about 1.4 parts of A9 and about 43 parts of A3.

Two separate "B" sides were then prepared, the first B1, consisting of 100 parts of S1, and the second, B2, consisting of 99 parts of S1 and 1 part of O1.

Two hand mix foams were then prepared utilizing the "A" side and each of the "B" sides, mixed in the following weight ratios:

$$\frac{A}{B1} = \frac{100}{88} = 1.136 \quad (1)$$

$$\frac{A}{B2} = \frac{100}{88} = 1.136 \quad (2)$$

Both hand mixed foams were stirred for ten seconds at ambient temperature (72° F.) with the following reaction times noted:

|  | Foam 1 | Foam 2 |
|---|---|---|
| Cream time, secs. | 18 | 12 |
| Gel time, secs. | 45 | 42 |
| Tack free time, secs. | 55 | 53 |

Good quality foams with fine cells were obtained at an average density of 1.8 pounds per cubic foot.

The preparation of the above hand mixed foams was then repeated, reducing the stirring time to about four seconds. The foam produced using B2 gave a foam of comparable quality and reactivity profile. The foam produced using B1 collapsed almost at the gel point.

Foams were then prepared utilizing a commercially available foam machine known as Hennecke H-100 at a weight ratio of A to B of 180/167 or 1.078, at ambient temperature (68° F.) and an output of 347 grams/sec.

Using B1, attempts were made to produce small and large foam buns by varying the shot times. All these attempts resulted in foams which collapsed before or near the gel point. The products obtained were high density solids with irregular coarse cells and voids.

Repeating this machine trial and using B2, foam buns of excellent quality were produced having average densities of 1.80 pounds per cubic foot.

Example 2

Using the hydrophilic polyisocyanate of Example 1 and using Mixture 1, an "A" side was prepared by mixing about 550 parts of polyisocyanate, about 92 parts of Mixture 1, about 135 parts of A2 and about 215 parts of A3.

On "B" sides, B1 and B2 from Example 1 were used. Additionally, a third and fourth "B" sides were prepared from 100 parts of S2 (B3) and from a mixture of 99 parts of S2 and 1 part of O1 (B4).

The combinations of compounds noted in Table 1 were mixed at ambient temperatures for ten seconds using a high speed mixer. The reactivity times were noted and the foam product was observed. The results were as indicated in Table 1.

TABLE 1

|  | Foam 1 | Foam 2 | Foam 3 | Foam 4 |
|---|---|---|---|---|
| Component A, pbw | 150 | 150 | 150 | 150 |
| Component B, pbw | B1, 130 | B2, 130 | B3, 130 | B4, 130 |
| Cream time, secs. | 21 | 24 | 21 | 23 |
| Gel time, | 42 | 44 | 42 | 47 |

TABLE 1-continued

| | Foam 1 | Foam 2 | Foam 3 | Foam 4 |
|---|---|---|---|---|
| secs. | | | | |
| Tack free time, secs. | 57 | 52 | 48 | 53 |
| Foam | Coarse cells, skin contained statistically distributed pin holes | Fine cells, normal skin | Coarse cells, skin had pin holes | Fine cells, normal skin |

Example 3

A hydrophilic polyisocyanate was prepared by reacting a blend of about 42 parts of P2 and about 42 parts of P3 with about 8 parts of M1 and about 8 parts of H1.

A reactive flame retardant mixture was then prepared by mixing about 44 parts of A4, about 44 parts of A2 and about 12 parts of A5.

An "A" side was then prepared by blending about 55 parts of the hydrophilic polyisocyanate, about 9 parts of Mixture 1, about 14 parts of the reactive flame retardant mixture, about 0.7 parts of A9 and about 22 parts of A3.

A "B" side was then prepared by blending 89 parts of S2, 1 part of O1 and 10 parts of A6.

A hand mix foam was then prepared by mixing 600 parts of the "A" side with 528 parts of the "B" side. The mixture was stirred for ten seconds. The following reaction times were noted:

| | |
|---|---|
| Cream time, secs. | 21 |
| Gel time, secs. | 40 |
| Tack free time, secs. | 49 |
| Rise time, secs. | 52 |

A foam having fine cells and exhibiting good physical properties at a density of 1.67 pcf was obtained.

Example 4

A flame retardant mixture was prepared by blending about 36 parts of A7, about 36 parts of A4 and about 29 parts of A8.

An "A" side was then prepared by blending about 55 parts of the hydrophilic polyisocyanate of Example 1, about 9 parts of Mixture 1, about 0.7 parts of A9, about 22 parts of A3 and about 14 parts of the flame retardant mixture. When 150 parts of this "A" side were mixed with 144 parts of the "B" side of Example 3 according to the procedure of Example 3, the following reaction times were noted:

| | |
|---|---|
| Cream time, secs. | 20 |
| Gel time, secs. | 38 |
| Tack free time, secs. | 46 |

A foam having fine cells and exhibiting good physical properties at a density of 2.13 pcf was obtained.

Example 5

An "A" side was prepared by blending about 55 parts of the hydrophilic polyisocyanate of Example 1, about 9 parts of Mixture 1, about 14 parts of A2, about 0.7 parts of A9 and about 22 parts of A3.

A "B" side was then prepared by mixing 98 parts of S1 with 2 parts of O2. The "A" and "B" sides were mixed together in a weight ratio of 150 to 104 (i.e., 1442) and stirred for five seconds. The following reaction times were noted:

| | |
|---|---|
| Cream time, secs. | 16 |
| Gel time, secs. | 32 |
| Tack free time, secs. | 44 |

A fine-celled, low density foam was obtained.

Example 6

Example 5 was repeated substituting 2 parts of O3 for the 2 parts of O2 in the "B" side. The following reaction times were noted:

| | |
|---|---|
| Cream time, secs. | 14 |
| Gel time, secs. | 30 |
| Tack free time, secs. | 42 |

A fine-celled, low density foam was obtained.

Example 7

In this Example, the "A" side of Example 5 was used. Five different "B" sides were prepared as follows:

| | |
|---|---|
| B3: | 98 parts of S1 |
| | 2 parts of O2 |
| B4: | 98 parts of S1 |
| | 2 parts of O3 |
| B5: | 98 parts of S1 |
| | 2 parts of O4 |
| B6: | 98 parts of S1 |
| | 2 parts of O5 |
| B7: | 98 parts of S1 |
| | 2 parts of O6 |

Hand mix foams were then prepared using the mix times noted in Table 2. The reaction times and foam characteristics were as noted.

TABLE 2

| | Foam 1 | Foam 2 | Foam 3 | Foam 4 | Foam 5 |
|---|---|---|---|---|---|
| A, pbw | 150 | 150 | 150 | 150 | 150 |
| B, pbw | B3, 104 | B4, 104 | B5, 104 | B6, 104 | B7, 104 |
| Mix time, secs. | 5 | 8 | 4 | 5 | 5 |
| Cream time, secs. | 16 | 14 | 10 | 15 | 10 |
| Gel time, secs. | 32 | 30 | 31 | 38 | 30 |
| Tack free time, secs. | 44 | 42 | 44 | 48 | 44 |
| Appearance | Good rise, good cells | Good rise, good cells | Good rise, good cells | Good rise, good cells | Good rise, good cells |

Example 8

A hydrophilic polyisocyanate was prepared by preheating 100 parts of P1 to 60° C. 10 parts of H2 and 10 parts of M2 were then added within 30 minutes with stirring. The stirring was continued for one hour. The product has an NCO content of 23.4% and a viscosity at 25° C. of 5700 cps.

A catalyst mixture (hereinafter referred to as Mixture 2) was then prepared by mixing about 199 parts of A1, 150 parts of A2 and 34 parts of C2.

An "A" side was prepared by mixing 57 parts of the isocyanate, 0.7 parts of A9, 20 parts of A3, 29 parts of A8 and 16 parts of Mixture 2. The "B" side was prepared by mixing 77 parts of S1 with 0.8 parts of O1. 307 parts of the "A" side were then mixed with 117 parts of the "B" side. The mixture was stirred for five seconds. The following reaction times were noted:

| | |
|---|---|
| Cream time, secs. | 20 |
| Gel time, secs. | 45 |
| Tack free time, secs. | 90 |

A slightly friable, fine-celled foam was formed.

Example 9

A hydrophilic polyisocyanate was prepared by reacting a blend of 50 parts of P2 and 50 parts of P3 with 10 parts of H2 and 10 parts of M1 using the same process as used in Example 8. The resultant product had an NCO content of 23.1% and a viscosity of 19,200 cps.

An "A" side was prepared by mixing 57 parts of the isocyanate, 0.7 parts of A9, 20 parts of A3, 29 parts of A8 and 16 parts of Mixture 2. The "B" side was identical to the "B" side used in Example 8. 307 parts of the "A" side were then mixed with 117 parts of the "B" side and stirred for five seconds. The following reaction times were noted:

| | |
|---|---|
| Cream time, secs. | 15 |
| Gel time, secs. | 45 |
| Tack free time, secs. | 70 |

A low friability, fine-celled foam was obtained.

Example 10

The following additional hydrophilic polyisocyanates, prepared in accordance with Example 8, have been produced and have been utilized to produce good quality foams according to the present invention.

| | | pbw |
|---|---|---|
| (A) | P2 | 100 |
| | P3 | 300 |
| | M1 | 80 |
| | NCO content: | 22.8% |
| | Viscosity at 25° C.: | 11,500 cps |
| (B) | P1 | 600 |
| | M3 | 150 |
| | H3 | 15 |
| | NCO content: | 22.9% |
| | Viscosity at 25° C.: | 1,200 cps |
| (C) | P2 | 41 |
| | P3 | 41 |
| | M4 | 17 |
| | H3 | 1 |
| | NCO content: | 23.9% |
| | Viscosity at 25° C.: | 6,500 cps |

(D) A mixture of
  (i) 28 parts of the reaction product of 41 parts of P2, 41 parts P3 and 17 parts M2, having an NCO content of 23.5%, and
  (ii) 28 parts of the hydrophilic polyisocyanates of Example 1.
(E) A mixture of
  (i) 19 parts of the reaction product of 83 parts of P1 and 17 parts of M2 (NCO content 23.4%; viscosity, 1,400 cps at 25° C.);
  (ii) 19 parts of the reaction product of 83 parts of P1 and 17 parts of M1 (NCO content of 23.4%; viscosity 1,250 cps at 25° C.); and
  (iii) 19 parts of the reaction product of 83 parts of P1 and 17 parts of M5 (NCO content 25.2%; viscosity 350 cps at 25° C.).

What is claimed is:

1. In a process for the production of an inorganic-organic foam composition comprising reacting an organic, nonionic hydrophilic polyisocyanate with an aqueous alkali metal silicate in the presence of a catalyst and a blowing agent, the improvement wherein said aqueous alkali metal silicate contains from 0.1 to 15% by weight, based on the weight of the aqueous alkali metal silicate, of a compound of the formula:

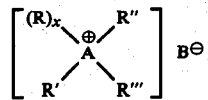

wherein A is selected from the group consisting of N, P and S,
wherein R, R', R" and R'" may be the same or different and are selected from the group consisting of allyl, vinyl, $C_1$ to $C_{17}$ alkyl or mono- or polyhydroxy substituted alkyl, $C_6$ to $C_{10}$ aryl or mono- or polyhydroxy substituted aryl, $C_7$ to $C_{22}$ aralkyl or mono- or polyhydroxy substituted aralkyl, and $C_7$ to $C_{22}$ alkaryl or mono- or polyhydroxy substituted alkaryl,
wherein x is 0 when A is S,
wherein x is 1 when A is N or P, and
wherein B is selected from the group consisting of OH, halogen and OR"" wherein R"" represents a $C_1$ to $C_{12}$ alkyl, with the proviso that when A is S, B is not OR"".

2. The process of claim 1 wherein said R, R', R", R'" and R"" are selected from the group consisting of $C_1$ to $C_4$ alkyl or monohydroxyalkyl.

3. The process of claim 1 wherein said compound is selected from the group consisting of methyl triethanol ammonium hydroxide, benzyl triethyl ammonium chloride, benzyltriphenyl phosphonium chloride, benzyltriethyl ammonium bromide, benzyltrimethyl ammonium hydroxide and benzyltrimethyl ammonium methanol.

4. The process of claim 1 wherein said compound is methyltriethanol ammonium hydroxide.

5. The process of claim 1 wherein the reaction mixture comprises from 5 to 99% by weight of said polyisocyanate, from 2 to 95% by weight of said aqueous alkali metal silicate containing said compound and an amount of amine catalyst, such that the total parts by weight of nitrogen supplied by the catalyst is from 0.01 to 1.5 parts per 100 parts of said polyisocyanate.

* * * * *

UNITED STATES PATENT AND TRADEMARK OFFICE
CERTIFICATE OF CORRECTION

PATENT NO. : 4,355,118

DATED : October 19, 1982

INVENTOR(S) : Miltiadis I. Iliopulos and Gert F. Baumann

It is certified that error appears in the above—identified patent and that said Letters Patent is hereby corrected as shown below:

Column 2, line 43, change "catalyst" to --agent--.

Column 5, line 66, after "ethylene oxide" insert --units--.

Column 6, lines 1 and 2, change "cP" to --cps--.

Column 7, line 13, "trimetallic acid" should be --trimellitic acid--.

Column 7, line 36, "some as" should be --such as--.

Column 8, lines 43 and 44, change "cP" to --cps--.

Column 10, bridging lines 59 and 60, change "pro-pane" to --propene--.

Column 11, line 12, "of produce" should be --to produce--.

Column 12, line 37, change "mPa-s" to --cps--.

Column 12, line 41, change "mPa-s" to --cps--.

Column 14, line 56, "compounds" should be --components--.

Column 15, last line, "(i.e., 1442)" should be --(i.e., 1.442)--.

UNITED STATES PATENT AND TRADEMARK OFFICE
CERTIFICATE OF CORRECTION

PATENT NO. : 4,355,118

DATED : October 19, 1982

INVENTOR(S) : Miltiadis I. Iliopulos and Gert F. Baumann

Page 2 of 2

It is certified that error appears in the above—identified patent and that said Letters Patent is hereby corrected as shown below:

Claim 3, at column 18, bridging lines 49 and 50, change "methanol" to --methoxide--.

Claim 5, at column 18, "5 to 99%" should be --5 to 98%--.

Signed and Sealed this

Eighth Day of March 1983

[SEAL]

Attest:

Attesting Officer

GERALD J. MOSSINGHOFF

Commissioner of Patents and Trademarks